United States Patent [19]

Zingher

[11] Patent Number: 4,660,158

[45] Date of Patent: Apr. 21, 1987

[54] ARRANGEMENT FOR DETERMINATION AND EVALUATION OF INK MEASURING STRIPS ON A PRINTED SHEET ON A MEASURING TABLE BY A DENSITOMETER

[75] Inventor: Oded Zingher, Alzenau, Fed. Rep. of Germany

[73] Assignee: M.A.N.-Roland Druckmaschinen Aktiengesellschaft, Fed. Rep. of Germany

[21] Appl. No.: 629,638

[22] Filed: Jul. 11, 1984

[30] Foreign Application Priority Data

Jul. 11, 1983 [DE] Fed. Rep. of Germany ....... 3324951

[51] Int. Cl.[4] ............................................ G06F 15/626

[52] U.S. Cl. .................................... 364/523; 364/559; 356/445

[58] Field of Search ............... 364/523, 526, 550, 519, 364/520, 171, 559; 382/1; 356/375, 443, 445; 358/107; 250/491.1

[56] References Cited

U.S. PATENT DOCUMENTS

| | | | |
|---|---|---|---|
| 4,200,932 | 4/1980 | Schramm et al. | 364/519 |
| 4,418,390 | 11/1983 | Smith et al. | 364/526 |
| 4,428,287 | 1/1984 | Greiner | 364/519 X |
| 4,494,875 | 1/1985 | Schramm et al. | 364/525 X |
| 4,513,366 | 4/1985 | Munekata et al. | 364/171 X |
| 4,518,862 | 5/1985 | Dorn | 356/375 X |
| 4,530,061 | 7/1985 | Henderson et al. | 364/171 X |
| 4,558,420 | 12/1985 | Gerber | 364/520 X |
| 4,561,061 | 12/1985 | Sakamoto et al. | 364/550 |
| 4,573,190 | 2/1986 | Tsunda et al. | 382/1 |

*Primary Examiner*—Errol A. Krass
*Assistant Examiner*—Joseph L. Dixon
*Attorney, Agent, or Firm*—Leydig, Voit & Mayer

[57] ABSTRACT

To sense the positions of ink measuring strips on a printed sheet and to scan the ink measuring strips with a densitometer, the printed sheet is placed on a commerically available digitizing board of the kind including a manually operated stylus and the densitometer is mounted on the positioning head of an X-Y positioning mechanism secured to the digitizing board. Preferably, the printed sheet includes position indicating marks which may be scanned by the stylus so that the position and orientation of the printed sheet with respect to the digitizing board is sensed. For repetitive testing of a number of printed sheets using the same format or arrangement of ink measuring strips, the format referenced to sheet coordinates is recalled from computer memory and transformed to the coordinate reference of the digitizing board using coordinate transformation coefficients based on the sensed position of the printed sheet with respect to the digitizing board. The format is, for example, determined by scanning the first printed sheet for a new format, transforming the sensed positions of the ink measuring strips to coordinate values referenced to the printed sheet, and storing the transformed values in memory. Preferably, the digitizing board includes a menu region for selecting various scanning, storing and recall functions.

11 Claims, 12 Drawing Figures

ARRANGEMENT FOR DETERMINATION AND EVALUATION OF INK MEASURING STRIPS ON A PRINTED SHEET ON A MEASURING TABLE BY A DENSITOMETER

BACKGROUND OF THE INVENTION

This invention relates generally to ink density control for printing machines, and more specifically relates to an apparatus having an optical densitometer for determining and evaluating ink measuring strips printed on test sheets.

In the state of the art of printing machines, the densities of ink or color balance in printing machines are established by numerous ink-dosing elements arranged across the width of the printing machine and the ink-dosing elements are individually adjustable by remote control adjusting devices. In order to generate the control signals for the automatic ink-dosing elements, ink measuring strips are printed on production sheets and some of these production sheets are selected as test sheets. After printing, the test sheets are conveyed to a densitometer table having an optical densitometer mounted for traversing or scanning the ink measuring strips. In state of the art systems, the signals from the optical densitometer are automatically processed to compare the measured ink densities to desired ink densities in order to remotely control the ink-dosing elements in the printing machine. See, for example, Schramm et al. U.S. Pat. No. 4,200,932 issued Apr. 29, 1980 for which a reexamination certificate issued Apr. 26, 1983. The major printing machine manufacturers sell systems similar to the system disclosed in Schramm et al., U.S. Pat. No. 4,200,932.

Although the ink feed controls for the printing machine are generally automatic, the selection of test sheets and the scanning of the ink measuring strips on the test sheets is a repetitious process. A laborious and sometimes error generating step in the process has been the proper alignment of the test sheets on the densitometer table.

The alignment problem is particularly serious in view of the various types of paper ranging from thin printing paper to thick cards. Card orders require the maximum utilization of the area available for printing and thus for card orders the positions and total area available for ink measuring strips are highly restricted. In practice, the ink measuring strips are typically at different places for different printing orders or jobs depending upon the orientation of the printed text on the sheets.

In order to simplify the recurrent evaluation of the measurement strips on the test sheets by the densitometer, the densitometer is typically mounted on a X-Y position mechanism similar to that used in well known digitally-driven X-Y flat-bed plotters. The plotter is interfaced to a numerical computer by known methods so that the numerical computer will drive the densitometer to any desired coordinates as specified by a procedure executed by the numerical computer. The numerical computer can drive the densitometer to scan the ink measuring strips so long as the ink measuring strips are at known positions with respect to the test sheet and the test sheet is at a known position with respect to the X-Y positioning mechanism. One method of insuring that the test sheet is at a known position with respect to the X-Y positioning mechanism is to lay the test sheet against stops. Since these stops project above the surface upon which the test sheet is laid, however, the stops may interfere with the scanning of the optical densitometer.

To avoid the use of stops for alignment of the test sheets, the actual position of the test sheet upon a sheet support may be sensed. As described in West German Pat. No. 3,232,490, the position of the test sheet on the sheet support is detected photoelectrically by arrays of optical sensors. The scanning of the ink measuring strips on the test sheet is then adjusted based on the position of the test sheet on its support.

SUMMARY OF THE INVENTION

The primary object of the invention is to provide a method and apparatus for scanning ink measuring strips quickly and at reasonable cost.

Another object of the invention is to provide a method for scanning ink measuring strips on test sheets that is highly reliable and is easily performed by printing machine operators.

Briefly, according to an important aspect of the invention, the position of the test sheet and the position of the ink measuring strips on the test sheet are detected by using a commercially available digitizing board with a stylus. The digitizing board has means for sensing the X-Y coordinates of the point selected by the stylus. The use of a commercially available digitizing board substantially reduces the cost of the complete measuring device. Handling with the stylus is particularly simple during operation. Moreover, since the position sensing is responsive to physical contact of the stylus with the digitizing board, the position sensing is particularly reliable. The digitizing board serves as the bed for the X-Y positioning mechanism upon which the optical densitometer is mounted for scanning the ink measuring strips. Therefore, the sensed coordinates are precisely aligned with the coordinates to which the X-Y positioning mechanism is referenced. The accuracy of the digitizing board depends on the selected grid size of the digitizing board sensor, and it is about 1/10 mm for the typical magnetostriction frequencies that are used.

According to a preferred method of the invention, the measuring process is started by placing the stylus on position marks printed at predetermined locations on the sheet. These position marks are printed, for example, at the lower right-hand corner of the sheet and at horizontal and vertical displacements from the lower right-hand corner. The position marks define a coordinate system referenced to the sheet. For the first test sheet having a particular pattern of ink measuring strips, the stylus is also used to obtain coordinate values of the ink measuring strips. The coordinate values of the ink measuring strips are then referenced to the coordinates of the sheet so that the positions of the ink measuring strips can be stored in memory and used independently of the position and orientation of the test sheet on the digitizing board. A second test sheet with a similar pattern of ink measuring strips, for example, need not have its ink measuring strips scanned by the stylus since the ink measuring strip positions stored in memory can be used. The position of the second test sheet on the digitizing board is obtained by scanning the position marks with the stylus. Then, the stored positions of the ink measuring strips are retrieved from memory and adjusted in response to the sensed coordinates of the sheet position marks on the second sheet. These adjusted coordinates represent the positions of the ink measuring strips on the second test sheet referenced to the digitizing board and are used to drive the X-Y positioning mechanism upon which the densitometer is mounted in order to scan the ink measuring strips. Thus, the most diverse patterns of ink measuring strips can be recorded and retrieved to suit particular printing jobs and to decrease the scanning time for repetitive test sheets for a particular pattern. Moreover, since sheet position marks are scanned for each test sheet, the scanning of the ink measuring strips may take into consideration stretch of the test sheet in two directions.

A menue board on the digitizing board can be used to allow the selection of further, more complicated linking functions. In addition to scanning sheet position, scanning a new format for the ink measuring strips, and scanning the ink measuring strips with the optical densitometer, a number of formats may be stored for subsequent recall and the densitometer can be automatically driven to a calibration position.

BRIEF DESCRIPTION OF THE DRAWINGS

Other objects and advantages of the present invention will become apparent upon reading the following detailed description and upon reference to the drawings in which.

Figure 1:
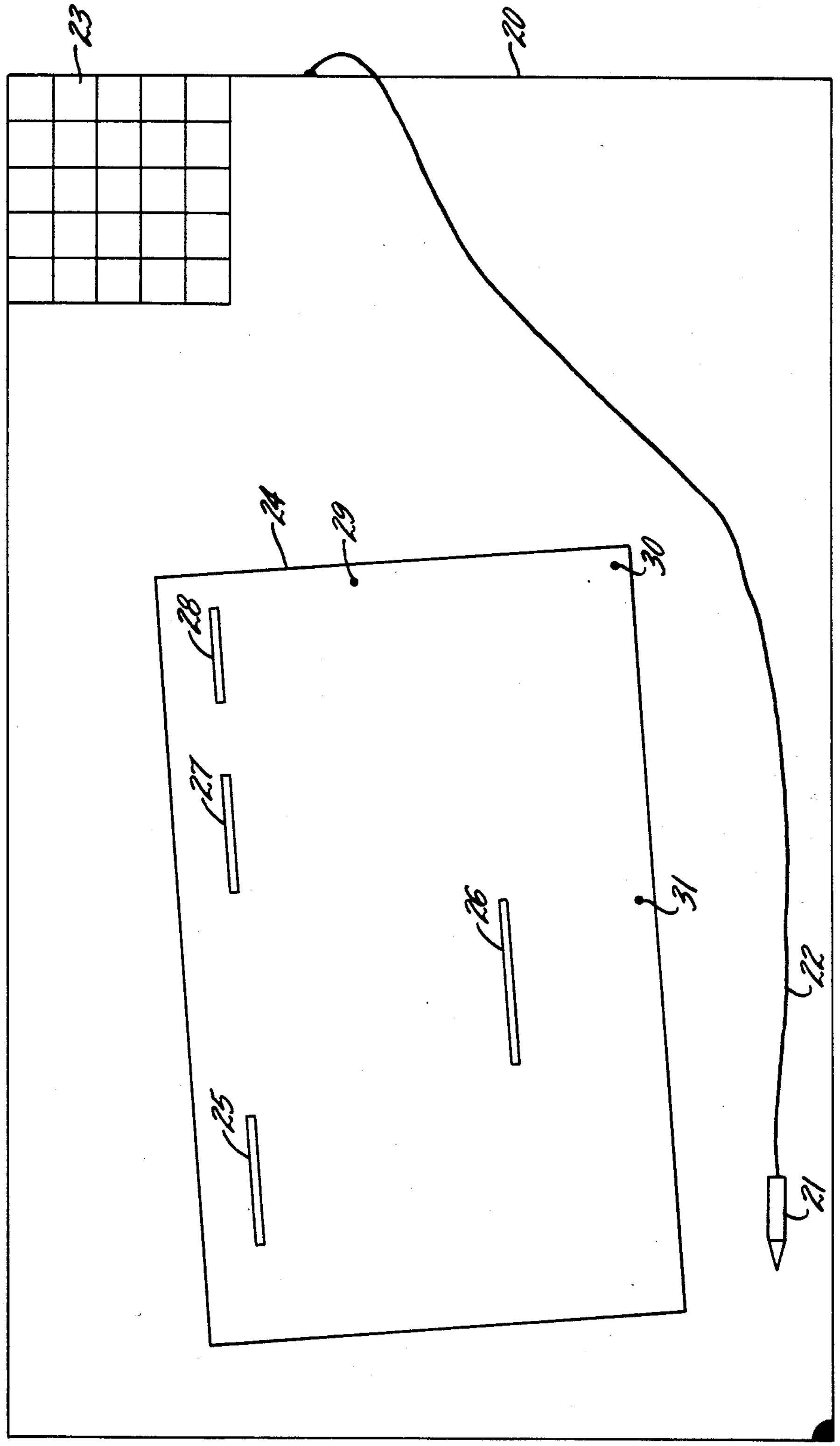
FIG. 1 is a plan view of a printed sheet having an arbitrary orientation on a digitizing board and having an irregular arrangement of ink measuring strips.

While the invention is susceptible to various modifications and alternative forms, a specific embodiment thereof has been shown by way of example in the drawings and will herein be described in detail. It should be understood, however, that the intention is not to limit the invention to the particular form disclosed, but, on the contrary, the intention is to cover modifications, equivalents, and alternatives falling within the spirit and scope of the invention as defined by the appended claims.

DESCRIPTION OF THE PREFERRED EMBODIMENT

Turning now to the drawings, there is shown in FIG. 1 a digitizing board 20 of the kind having a manually operated stylus 21 which is used to select points on the digitizing board. Once a point is selected by physical contact of the stylus 21 with the surface of the digitizing board 20, the coordinates of the selected point are sensed. The stylus 21 is connected to sensor circuits in the digitizing board 20 via a cable 22. This particular kind of digitizing board has been found to be especially reliable and economical. It has been used for high precision drafting work as well as a graphics aid for hobby computers. A low cost version, for example, is commercially available from the Radio Shack Co. of the Tandy Corporation, Fort Worth, Tex. 76107. The digitizing board 20 typically functions as an accessory to a numerical computer, and is provided with standard software which enables a computer programmer to access the digitizing board 20 by a particular subroutine call. The subroutine call, for example, returns coordinate values when the stylus 21 is pressed into contact with the surface of the digitizing board 20. The digitizing board 20 is typically provided with a menue board 23 to permit the operator to select a number of predetermined functions. The menue board 23, for example, is an array of rectangles. Each rectangle may be assigned a respective function. When a coordinate value is obtained from the digitizing board 20 falling within the rectangular region of a particular function, the coordinate values are interpreted as a request for the numerical computer to perform the respective function.

According to an important aspect of the present invention, the digitizing board 20 is used to determine the position and orientation of a printed test sheet 24 placed on the digitizing board 20, and also to determine the arrangement or format of ink measuring strips 25–28 printed on the test sheet 24.

In order to determine the position and orientation of the test sheet 24 on the digitizing board 20, the test sheet has three position indicating marks 29, 30 and 31 printed at predefined locations on the test sheet. Preferably, a mark 29 is printed on the right-hand side of the sheet 24, a mark 30 is printed in the bottom right-hand corner of the sheet, and a mark 31 is printed in the bottom margin of the sheet. The mark 30, for example, establishes an origin for referencing coordinates to the sheet 24. A line including the marks 29 and 30 establishes a Y coordinate axis for the coordinate system referenced to the sheet 24. The distance between the marks 29 and 30 enables stretching of the test sheets in the Y direction to be measured. Similarly, the distance between the marks 30 and 31 enables the stretching of the sheet in the orthogonal X direction to be measured.

Figure 2:
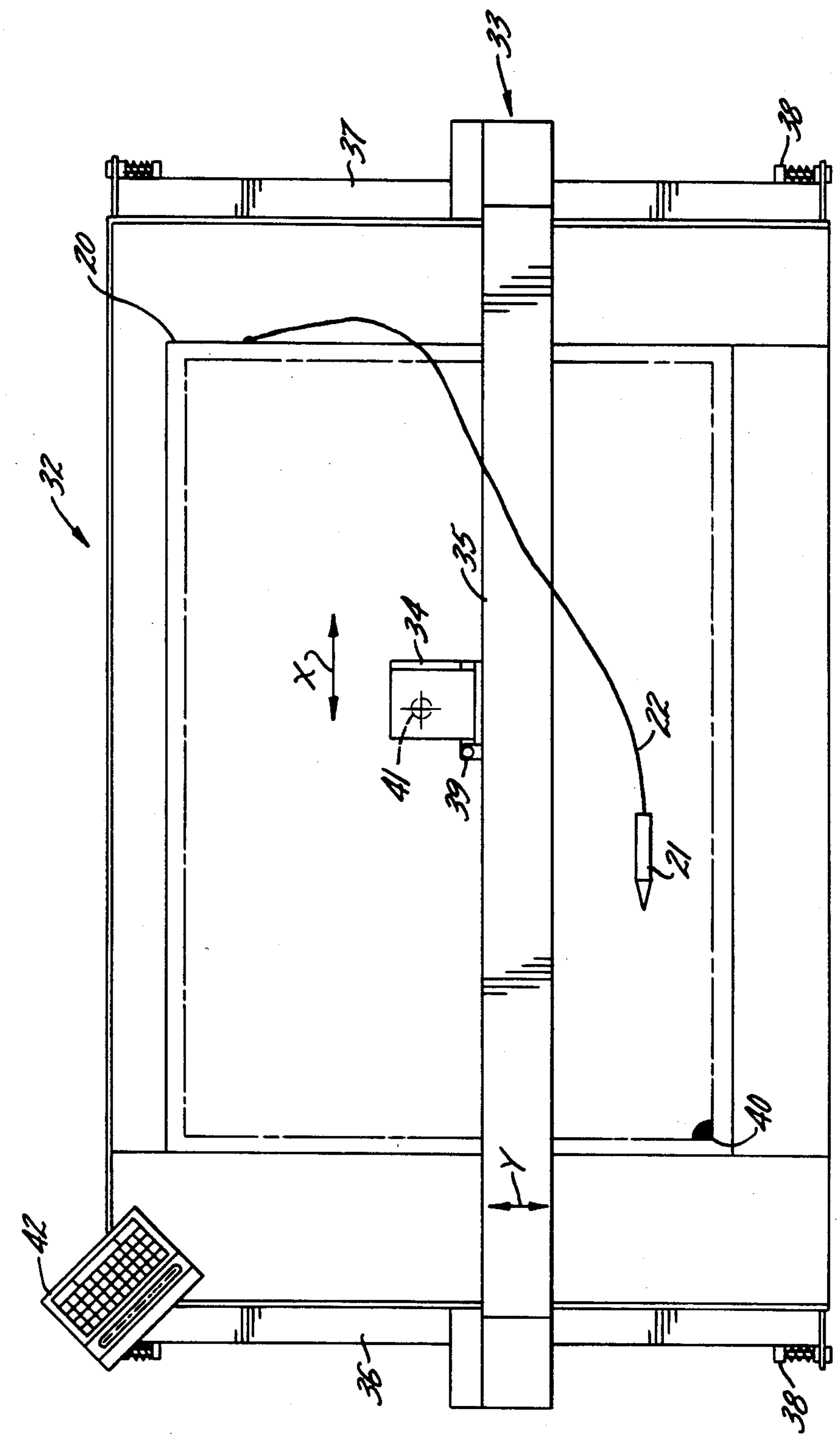
FIG. 2 is a plan view of an X-Y positioning mechanism mounted to the digitizing board and carrying an optical densitometer for scanning the ink measuring strips on a test sheet placed on the digitizing board, and also showing a computer terminal.

In accordance with another aspect of the present invention, the digitizing board 20 is part of a coordinate table generally designated 32 which also includes an X-Y positioning mechanism generally designated 33 in FIG. 2. Thus, the sensed coordinates on the digitizing board 20 are precisely aligned with the coordinates to which the X-Y positioning mechanism 33 is referenced. Persons skilled in the art will recognize that the X-Y positioning mechanism 33 is commercially available as part of a digitially-driven X-Y flat-bed plotter. The X-Y positioning mechanism 33 has a positioning head 34 which travels in the X direction across a cross-bar 35. The cross-bar 35 is driven in the Y direction along guides 36, 37 on the left-hand and right-hand sides of the coordinate table 32, respectively. The X-Y positioning mechanism 33 is interfaced to a numerical computer 53' in FIG. 3 by known methods so that the numerical computer will drive the positioning head 34 to any commanded coordinates as specified by a procedure executed by the numerical computer. Since the digitizing board 20 is fixed to the coordinate table 32 to which the X-Y positioning mechanism 33 is attached, the numerical computer has a direct correspondence between the coordinates sensed on the digitizing board 20 and the coordinates to which the positioning head 34 is driven. When electrical power is first applied to the system, for example, this correspondence is established by driving the position head 34 to limits established by stops such as the stops 38 in the negative Y direction, and the limit positions are sensed by limit switches. The X-Y positioning mechanism is also provided with the usual optical sight 39 for precise alignment with a reference mark 40 to establish the origin for the coordinates referenced by the digitizing board 30 and the X-Y positioning mechanism 33.

To scan the ink measuring strips 25–28 on the printed sheet 24, the positioning head 34 carries an optical densitometer 41 which is fixed with respect to the optical sight 39. Thus, the densitometer 41 can be driven to the positions of the ink measuring strips based on the positions sensed by the digitizing board 20. A computer terminal 42 is provided to permit the printing machine operator (not shown) to communicate with the numerical computer 53' in FIG. 3 which receives the sensed coordinates from the digitizing board 20 and drives the X-Y positioning mechanism 33.

Figure 3:
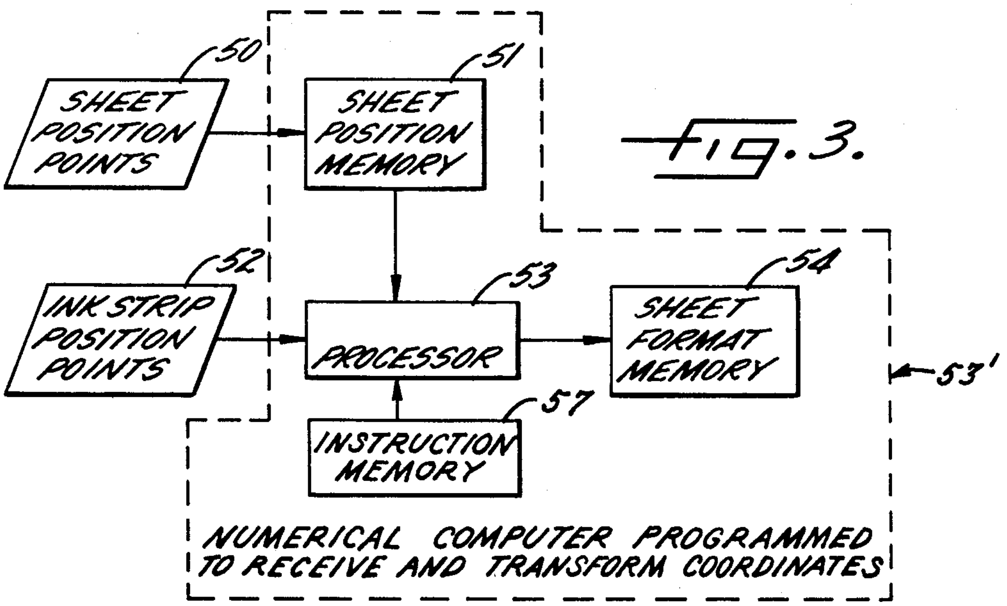
FIG. 3 is a block diagram for the process of storing a new format for the ink measuring strips.

Turning now to FIG. 3, there is shown a block diagram for the process of determining the format or arrangement of ink measuring strips on a test sheet. This process is performed with the aid of the numerical computer 53' which is conventional and therefore includes a processor 53 executing instructions fetched from an instruction memory 57. The test sheet 24 is placed on the digitizing board 20 as shown in FIG. 1. The printing machine operator then uses the stylus 21 to contact or scan the sheet position measuring points 29, 30 and 31. The coordinates of the sheet position points 50 (FIG. 3) are read into a sheet position memory 51. Then the printing machine operator uses the stylus 21 to contact or scan the ink measuring strips 25–28. The coordinates or positions of the ink strips 52 are transformed by the processor 53 of the computer taking into account the coordinate data stored in the sheet position memory 51 so that the coordinates of the ink measuring strips are referenced to the test sheet 24. The coordinates referenced to the test sheet are stored in a sheet format memory 54.

Figure 4:
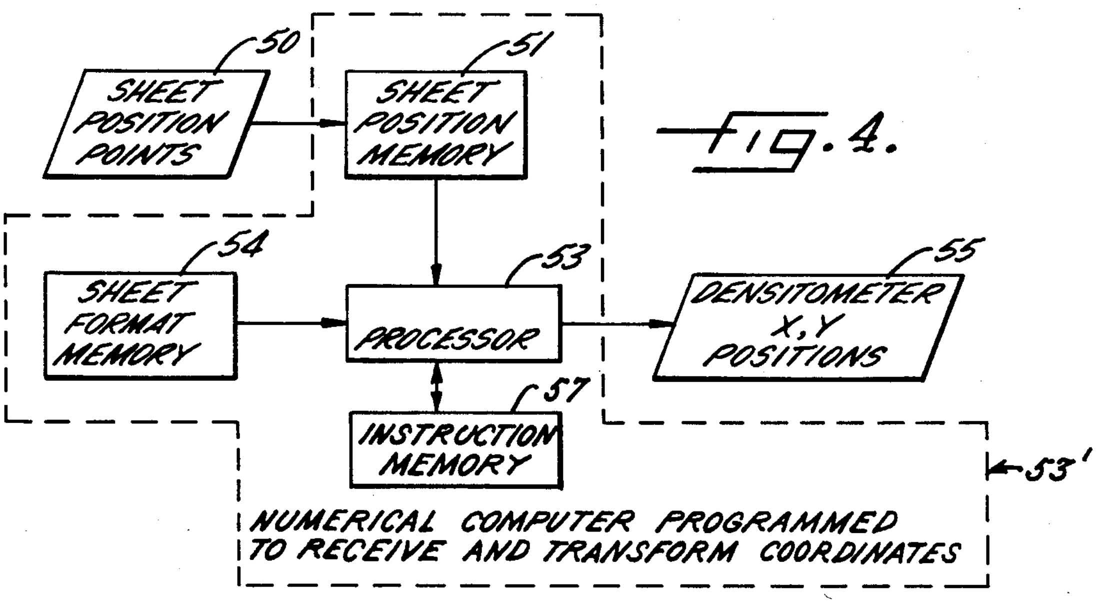
FIG. 4 is a block diagram for the process of scanning the ink measuring strips on a test sheet using a previously stored format for the ink measuring strips.

Since the coordinates of the ink measuring strips stored in the sheet format memory 54 are independent of the position or orientation of the sheet 24 on the digitizing board 20, test sheets having a similar format can be scanned merely by scanning the sheet position marks 29, 30 and 31, and scanning of the particular ink measuring strips 25–28 on subsequent test sheets is not required. The scanning of a subsequent test sheet is illustrated in FIG. 4. During scanning of the sheet position marks 29, 30 and 31, the coordinates of the sheet position points 50 are again read into the sheet position memory 51. Data from the sheet format memory 54 are read by the processor 53 of the computer and an inverse coordinate transformation is performed taking into consideration the data stored in the sheet position memory 51 to transform the coordinate values in the sheet format memory 54 to the coordinate reference of the digitizing board 20. These coordinate values referenced to the digitizing board 20 are the desired x,y positions 55 of the densitometer 41. Thus, the processor 53 of the computer transmits signals to the X-Y positioning mechanism 33 so that the densitometer 41 scans the ink measuring strips 25–28, taking into consideration the particular orientation of the sheet 24 with respect to the digitizing board 20.

Figure 5:
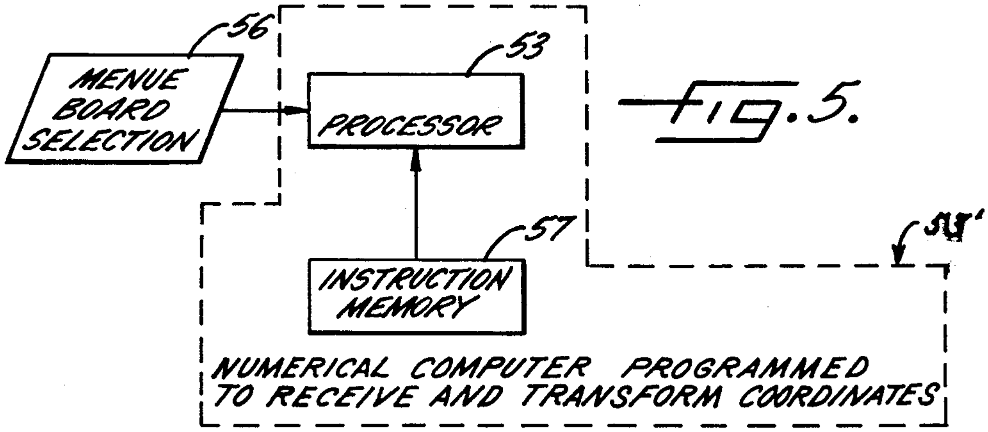
FIG. 5 is a block diagram for the general process of performing a function selected from a menue board region on the digitizing board of FIG. 1.

Preferably, the printing machine operator instructs the processor 53 of the computer to scan a new format as shown in FIG. 3 or to use a prerecorded format as shown in FIG. 4 by selecting a corresponding function from the menue board 23 (FIG. 1). The selection process is illustrated generally in FIG. 5. The processor 53 of the computer 53' the menue board selection 56 comprising coordinate values received from the digitizing board 20 which fall within the region of the menue board 23. The processor 53 determines the particular function corresponding to the particular region in the menue board 23 within which the coordinates fall. The processor 53 then obtains and executes instructions from the computer's instruction memory 57 corresponding to the particular function selected on the menue board 23.

Figure 6:
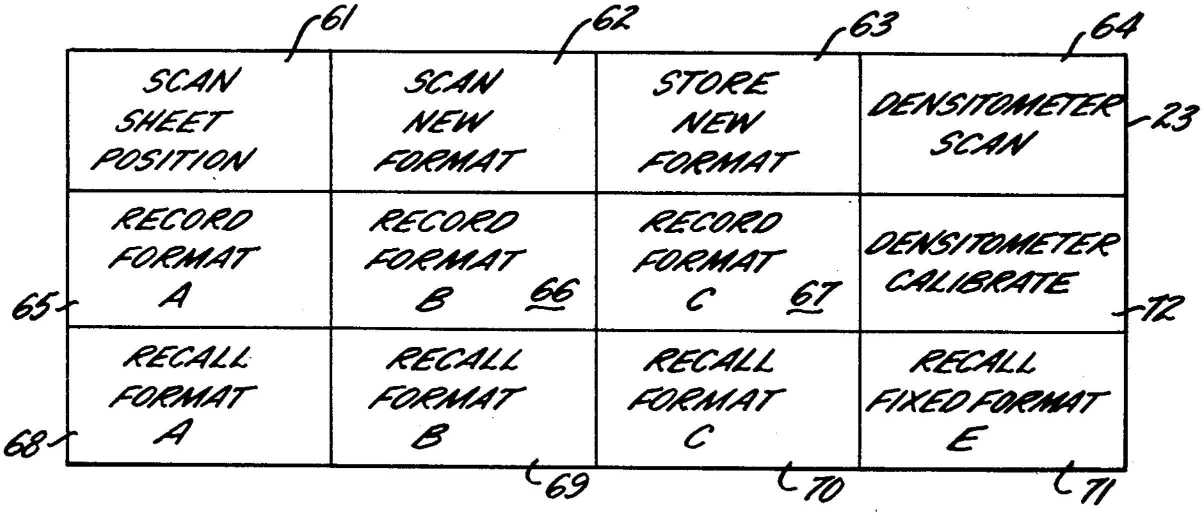
FIG. 6 shows a few of the functions that can be included on the menue board region of the digitizing board in FIG. 1.

Turning to FIG. 6 there is shown a representative set of functions included on the menue board 23. The names of the function, for example, are imprinted on a transparent overlay placed on the menue board 23. The SCAN SHEET POSITION function 61 is selected to signal the start of scanning with the stylus 21 of the sheet position marks 29, 30 and 31. The SCAN NEW FORMAT function 62 is selected to signal the start of scanning with the stylus 21 of the ink measuring strips 25–28. The STORE NEW FORMAT function 63 is selected to signal the termination of scanning with the stylus 21 of the ink measuring strips 25–28. The DENSITOMETER SCAN function 64 is selected to instruct the computer to scan the ink measuring strips 25–28 with the optical densitometer by driving the X-Y positioning mechanism 33. The menue board 23 also includes several RECORD FORMAT functions 65–67 which record the new format stored by the STORED NEW FORMAT function 63 in non-volatile memory. These recorded formats may be recalled from the non-volatile memory by selecting corresponding RECALL FORMAT functions 68–70. A RECALL FIXED FORMAT function 71 could also be provided to recall a permanently stored format from non-volatile memory. In other words, the machine operator would not have the option of changing the fixed format. The DENSITOMETER CALIBRATE function 72 is selected to drive the optical sight 39 (FIG. 2) to the vicinity of the calibration mark 40.

Figure 7:
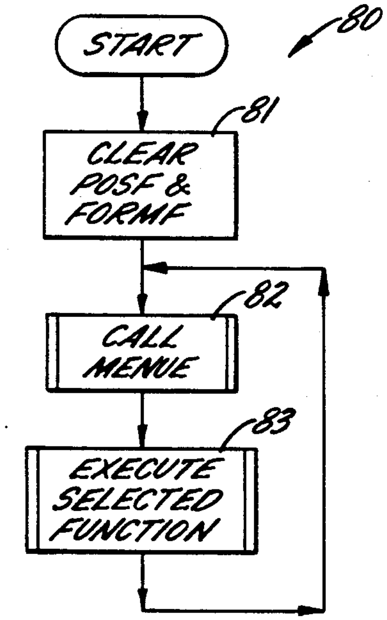
FIG. 7 is a flowchart of an executive procedure for a numerical computer receiving coordinates from the digitizing board of FIG. 1 and driving the X-Y positioning mechanism for scanning the ink measuring strips.

The preferred control method is defined by computer software including an executive program as shown in FIG. 7 and a number of subroutines as shown in FIGS. 8–12 which are responsive to operator selections on the menue board 23. The subroutines use logical variables or flags to insure that preconditions required by certain of the functions or subroutines are established before the subroutines are executed to perform their corresponding functions. In the flowchart generally designated 80 of the executive program, a flag POSF is used to indicate whether the sheet position memory 51 includes data describing a particular sheet position. A flag FORMF is used to indicate whether the sheet format memory 54 includes data describing a particular format or arrangement of ink measuring strips. In the first step 81 of the executive program, the flags POSF and FORMF are cleared to indicate that these memories are initially empty. These flags are later used, for example, to ensure that sheet position is scanned before a new format is determined and to ensure that a format is determined or recalled from memory before a densitometer scan is performed. Once these flags are cleared in step 81, the executive program sequentially calls a subroutine MENUE in step 82 to obtain a menue selection, and in step 83 calls a subroutine corresponding to the selected menue function in order to perform the selected function.

Figure 8:
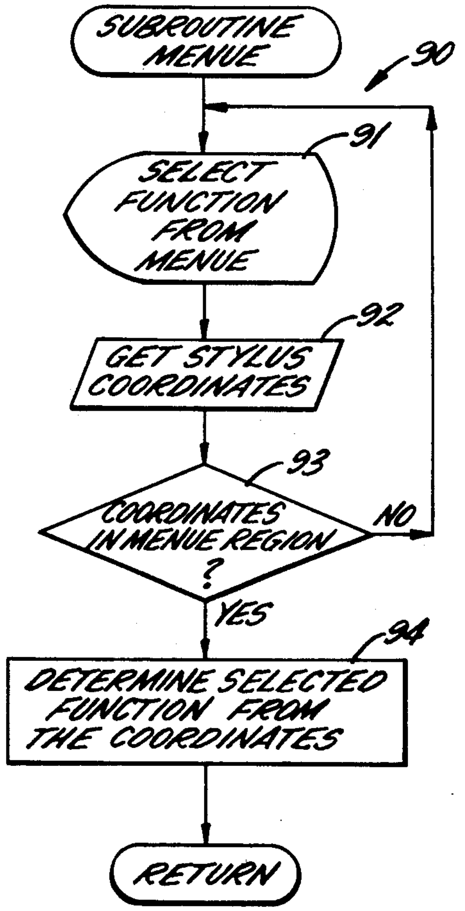
FIG. 8 is a flowchart of a subroutine for obtaining the function selected from the menue board.

A flowchart generally designated 90 for obtaining a menue selection is shown in FIG. 8. In step 91 an instructive message is displayed at the terminal 42 (FIG. 2) to tell the operator to select a function from the menue 23. In step 92, the coordinates of the stylus are obtained from the sensor circuits (not shown) in the digitizing board 20. In step 93 the coordinates received from the digitizing board 20 are compared to the coordinates of the boundary of the menue board 23 to determine whether the coordinates are in the menue region. When the coordinates fall within the menue region, the coordinates are further compared in step 94 to the boundaries of the individual rectangles corresponding to the menue functions to determine the selected function. Execution then returns to the calling program.

Figure 9:
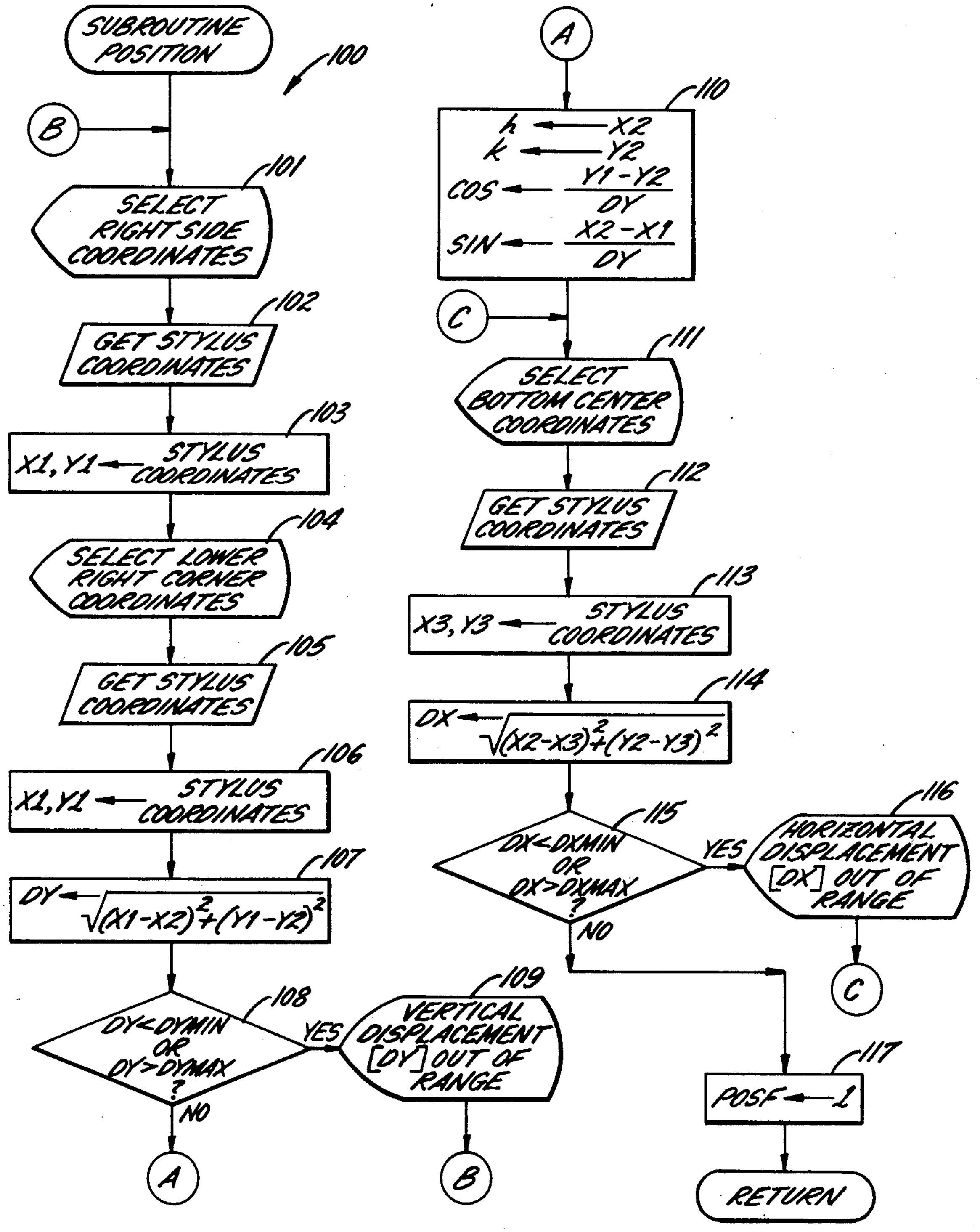
FIG. 9 is a flowchart of a subroutine for sensing the position of a test sheet on the digitizing board.

Turning now to FIG. 9 there is shown a flowchart of a POSITION subroutine generally designated 100 which is called in response to operator selection of the SCAN SHEET POSITION function 61 on the menue board 23. In the first step 101, the operator is told to select the right side coordinates for point 29 in FIG. 1. The stylus coordinates are obtained in step 102 and stored in step 103 in the sheet position memory 51 at memory locations X1 and Y1. Similarly, in step 104 the operator is told to select the lower right corner coordinates of the position mark 30, and the stylus coordinates are obtained in step 105 and stored in step 106 in the sheet position memory at memory locations X2 and Y2. In order to perform coordinate transformations and to compensate for sheet shrinkage in the vertical or Y direction, the distance DY between the position marks 29 and 30 is calculated in step 107. In order to detect erroneous scanning by the operator, the distance DY is compared to maximum and minimum values in step 108 to determine whether it is reasonable. If the distance DY is out of bounds, then in step 109 the operator is told that the particular vertical displacement is out of range, and execution returns back to step 101 to obtain reasonable coordinate values. If the distance DY is within bounds, then in step 110 the coordinate transformation constants h, k, COS and SIN are calculated. These transformation constants indicate the position and angular orientation of the sheet 24 with respect to the coordinate axis to which the digitizing board 20 is referenced. In step 111, the operator is told to scan the bottom position mark 31 to obtain the bottom center coordinates which are received in step 112 and stored in step 113 in the locations X3 and Y3 of the sheet position memory 51. In step 114 the distance DX between the sheet position marks 30 and 31 is calculated. Then in step 115 the distance DX is compared to maximum and minimum values to determine whether the distance DX is reasonable. If not, the operator is told in step 116 that the particular horizontal displacement is out of range, and execution jumps back to step 111 to rescan the bottom center coordinates. If the distance DX is within bounds, then the sheet position memory 51 has stored data indicating the position of the test sheet 24 on the digitizing board 20. Hence, in step 117, the position flag POSF is set and execution returns to the calling program.

Figure 10:
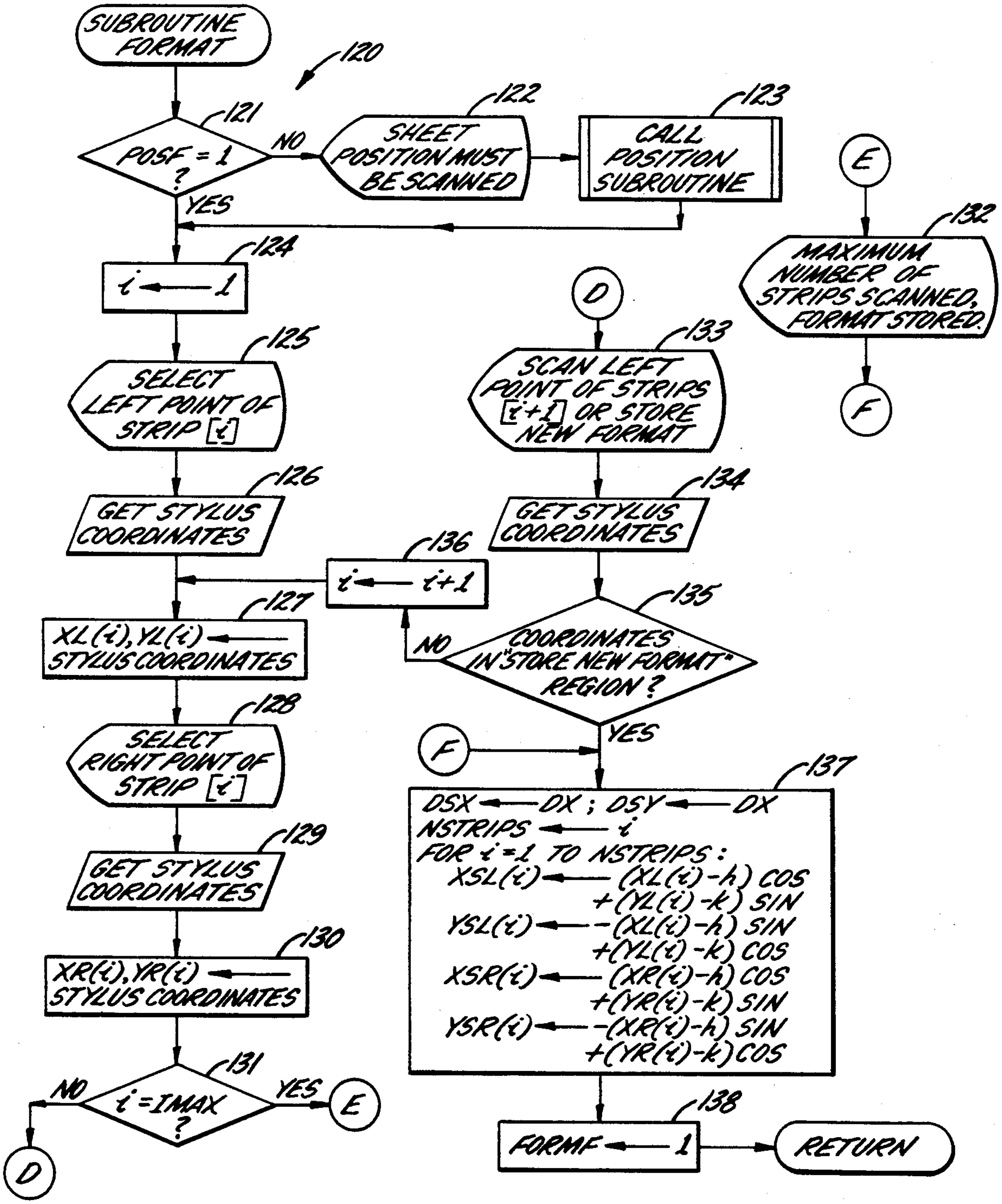
FIG. 10 is a flowchart of a subroutine for determining and storing a new format or arrangement of the ink measuring strips on the test sheets.

Turning now to FIG. 10 there is shown a flowchart generally designated 120 of a subroutine for scanning a new format or arrangement of ink measuring strips on a test sheet. In step 121, the sheet position flag POSF is compared to one to determine whether the sheet position has already been scanned. If not, then in step 122 the operator is told that the sheet position must be scanned and in step 123 the position scanning subroutine 100 of FIG. 9 is called.

The format scanning subroutine 120 uses an index i to count the number of ink measuring strips that are scanned on a particular test sheet. In step 124 the index i is set to one to begin the scanning of the first ink measuring strip. In step 125 the operator is told to select the left point of the particular ink measuring strip and in step 126 the stylus coordinates are obtained. In step 127 the stylus coordinates are stored in memory in respective elements of coordinate arrays XL and YL. Then in step 128 the operator is told to select the right point of the particular ink measuring strip. In step 129 the stylus coordinates are obtained and in step 130 they are stored in respective elements of arrays XR and YR.

Prior to scanning the next ink measuring strip, in step 131 the index i is compared to a maximum value IMAX representing the maximum number of ink measuring strips which may be accommodated by the arrays XL, YL, XR, and YR. If this maximum value is reached, the operator is told in step 132 that the maximum number of strips have been scanned and the format will be stored. If this maximum is not reached which is the normal case, the operator is told in step 133 to scan the left point of the next strip or to select a menue function for storing the new format. In step 134 the operator's response is obtained by receiving the stylus coordinates from the digitizing board 20. In step 135 the coordinates are compared to the coordinates of the boundaries in the menue region for the STORE NEW FORMAT function. If the received coordinates are out of these bounds, then they represent the coordinates of the left point of the next ink measuring strip. Therefore, in step 136, the index i is incremented to point to the next ink measuring strip and execution continues in step 127 to store the received stylus coordinates.

The coordinates for more measurement strips are obtained until in step 135 coordinates are obtained that are within the STORE NEW FORMAT function of the menue region 23. Then, in step 137 the format is stored by transforming the received stylus coordinates of the beginning and ending points of the ink measuring strips in response to the position of the sheet indicated by the data in the sheet position memory 51. Specifically, the stylus coordinates of the ink measuring strips are referenced with respect to the coordinate system of the digitizing board 20, and these stylus coordinates are transformed to coordinates referenced to the test sheet. Also stored in the format memory 55 are the distances DX and DY and the number of strips NSTRIPS indicated by the final value of the index i. The coordinate transformations use the transformation coefficients h, k, COS and SIN stored in the sheet position memory 51. Finally, in step 138, the format flag FORMF is set to indicate that a particular format has been scanned and stored. Execution then returns to the calling subroutine.

Figure 11:
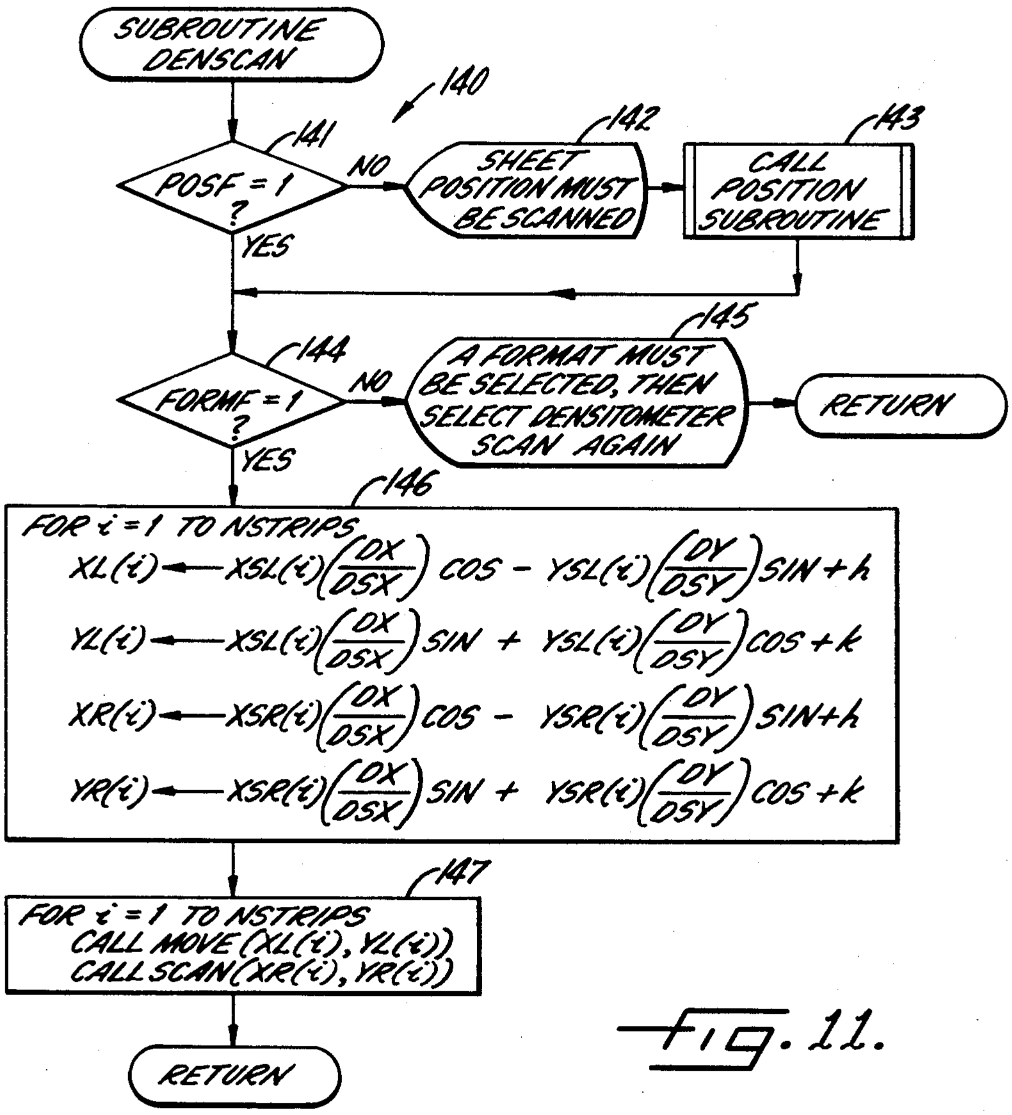
FIG. 11 is a flowchart of a subroutine for driving the X-Y positioning mechanism so that the optical densitometer scans the ink measuring strips.

Turning now to FIG. 11 there is shown a subroutine generally designated 140 for scanning the ink measuring strips 25–28 with the optical densitometer 41, as was generally shown and described in conjunction with FIG. 4. In the first step 141, the position flag POSF is compared to one to ensure that the sheet position memory 50 has stored therein data describing the sheet position. If the sheet position flag POSF is not set, then in step 142 the operator is told that the sheet position must be scanned, and the POSITION subroutine 100 of FIG. 9 is called in step 143 to scan the sheet position. In step 144 the format flag FORMF is compared to one to ensure that the sheet format memory 54 has stored therein data describing a format for the ink measuring strips printed on the printed sheet. If the format flag FORMF is not set, then in step 145 the operator is told that a format must be selected and the densitometer scan function must again be selected on the menue board 23. Execution then returns to the executive program so that the operator may scan a new format or recall a format stored in non-volatile memory.

If the format flag FORMF was found to be set in step 144, then in step 146 the positions of the ink measuring strips with respect to the digitizing board 20 are calculated by applying an inverse transformation to the coordinate values stored in the sheet format memory using the transformation coefficients stored in the sheet position memory 51. The coordinates stored in the sheet format memory 54 are also scaled by the respective ratios of distances DX/DSX and DY/DSY before the coordinate transformations are applied in order to compensate for sheet shrinkage. The coordinates calculated in step 145 with respect to the digitizing board 20 are then used in step 146 to move the densitometer 41 to the beginning points of the ink measuring strips and to scan the densitometer 41 across the ink measuring strips to the end points of the strips.

Figure 12:
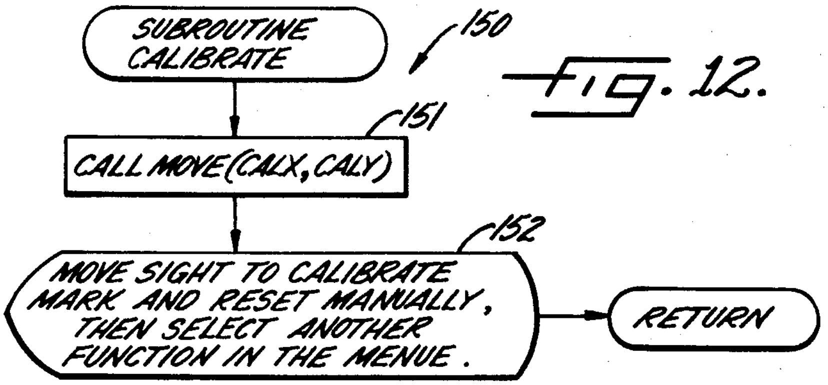
FIG. 12 is a flowchart of a subroutine for moving the optical densitometer to a predetermined calibration position.

Turning now to FIG. 12 there is shown a flowchart of a subroutine 150 executed in response to selecting the densitometer calibrate function 72 on the menue board 23. In the first step 151 the sight 39 of the X-Y positioning mechanism 33 is driven to the coordinates CALX, CALY of the reference mark 40. Then in step 152 the operator is told to operate manual controls for moving the sight in direct alignment with the calibration mark 40 and to reset the position counters for the X-Y positioning mechanism 33 after alignment is obtained. Execution then returns to the executive program in FIG. 7.

In view of the above, an apparatus and method have been described for the densitometric measurement and evaluation of printed sheets quickly and at reasonable cost. By mounting the optical densitometer on an X-Y position mechanism secured to a digitizing board, the positions of the ink measuring strips are precisely determined to permit precise scanning by the optical densitometer. Handling with the stylus is particularly easy during operation and the commercially available digitizing board is a very reliable position sensing device. When a number of test sheets use the same format or arrangement of ink measuring strips, the positions of the ink measuring strips on only a single test sheet need by sensed. By printing additional position sensing marks on the test sheets, the positions of the ink measuring strips for the first sheet are transformed and stored as coordinate values referenced to the printed sheet. For other test sheets with the same format, the stored values are recalled from memory and depending on the particular positions of the other sheets, the recalled values are transformed to coordinate values with respect to the digitizing board which are used for controlling the scanning by the optical densitometer. A menue region on the digitizing board provides convenient operator selection of the scanning, storage, and recall functions, and also provides a densitometer calibration function.

What is claimed is:

1. An apparatus having an optical densitometer for evaluating ink measuring strips on a printed sheet comprising (a) a digitizing board on which said printed sheet is laid and having a stylus to permit an operator to select predefined points on the sheet and means for sensing the coordinates of the selected points with respect to said digitizing board, (b) a digitally-driven X-Y positioning mechanism mounted to the digitizing board and carrying said optical densitometer for positioning the optical densitometer to focus on the printed sheet at commanded coordinates with respect to said digitizing board, and (c) a numerical computer including a processor and memory for (1) receiving coordinates of said ink measuring strips on said printed sheet when said coordinates are selected by said operator touching said stylus to said ink measuring strips on said printed sheet laid on said digitizing board and the coordinates of the points thereby selected are sensed by said means for sensing, and (2) commanding said X-Y positioning mechanism to move said optical densitometer to scan said ink measuring strips in response to the sensed coordinates of said ink measuring strips, so that said printed sheet need not have a predefined position and orientation with respect to said digitizing board and so that said sheet need not be moved with respect to said digitizing board from the time that said coordinates are selected to the time that said ink measuring strips are scanned.

2. The apparatus as claimed in claim 1, wherein said digitizing board has a predefined region including a menue board for enabling the operator to select with said stylus a desired one of a plurality of predefined functions, including said functions of (1) receiving the sensed coordinates of said ink measuring strips, and (2) scanning said ink measuring strips.

3. The apparatus as claimed in claim 1, wherein said numerical computer receives the sensed coordinates of beginning and ending points of each of said ink measuring strips.

4. An apparatus having an optical densitometer for evaluating ink measuring strips on a printed sheet comprising (a) a digitizing board on which said printed sheet is laid and having a stylus to permit an operator to select predefined points on the sheet and means for sensing the coordinates of the selected points with respect to said digitizing board, (b) a digitally-driven X-Y positioning mechanism mounted to the digitizing board and carrying said optical densitometer for positioning the optical densitometer to focus on the printed sheet at commanded coordinates with respect to said digitizing board, and (c) a numerical computer including a processor and memory for (1) receiving the coordinates of position marks printed on said printed sheet at predetermined locations with respect to said printed sheet when said coordinates are selected by said operator touching said stylus to said ink measuring strips on said printed sheet laid on said digitizing board and the coordinates of the points thereby selected are sensed by said means for sensing, (2) obtaining from said memory predetermined coordinates of the ink measuring strips with respect to said printed sheet, (3) transforming the predetermined coordinates obtained from memory to coordinates with respect to the digitizing board in response to the sensed and received coordinates of said position marks, and (4) commanding said X-Y positioning mechanism to move said optical densitometer to scan said ink measuring strips in response to the transformed predetermined coordinates obtained from memory, so that the ink measuring strips are scanned by the optical densitometer regardless of the position and orientation of the printed sheet on the digitizing board and so that said sheet need not be moved with respect to said digitizing board from the time that said coordinates are selected to the time that said ink measuring strips are scanned.

5. The apparatus as claimed in claim 4, wherein said digitizing board has a predefined region including a menue board indicating a plurality of predefined functions which the operator can select with said stylus, including said functions of (1) receiving the sensed coordinates of position marks, (2) obtaining from said memory predetermined coordinates of the ink measuring strips with respect to the printed sheet, and (3) scanning said ink measuring strips.

6. The apparatus as claimed in claim 4, wherein said position marks define at least three non-collinear points and wherein said numerical computer includes means for monitoring the stretch of the printed sheet in two directions in response to the sensed coordinates of said non-collinear points

7. The apparatus as claimed in claim 4, wherein said numerical computer includes means for receiving the coordinates of said ink measuring strips with respect to said digitizing board sensed by said means for sensing, means for transforming said coordinates of said ink measuring strips with respect to said digitizing board to transformed coordinates with respect to the printed sheet in response to said received coordinates of said position marks, and storing said transformed coordinates with respect to the printed sheet in said memory as said predetermined coordinates of the ink measuring strips with respect to said printed sheet.

8. A method for using an apparatus having (a) an optical densitometer for evaluating ink measuring strips on a printed sheet, (b) a digitizing board on which said printed sheet is laid and having a stylus to permit an operator to select predefined points on the sheet and means for sensing the coordinates of the selected points with respect to said digitizing board, (c) a digitally-driven X-Y positioning mechanism mounted to the digitizing board and carrying said optical densitometer for positioning the optical densitometer to focus on the printed sheet at commanded coordinates with respect to said digitizing board, and (d) a computer including a memory, said computer being programmed for (1) receiving coordinates from said means for sensing, (2) storing and retrieving coordinates from said memory, (3) performing coordinate transformations and inverse coordinate transformations between coordinates referenced to said sheet and coordinates referenced to said digitizing board, and (4) commanding said X-Y positioning mechanism to move said optical densitometer to scan between predetermined coordinates, said method comprising the steps of (i) placing a first printed sheet on said digitizing board, manually selecting with said stylus sheet position marks printed at predetermined locations on said first printed sheet and ink measuring strips printed on said first printed sheet, (ii) instructing said computer to receive the sensed coordinates of the points selected by said stylus to transform the received coordinates of the ink measuring strips to coordinates with respect to said first printed sheet in response to the received coordinates of the sheet position marks, and to store the transformed coordinates in memory, (iii) removing the first sheet from the digitizing board, placing a second printed sheet similar to said first printed sheet on said digitizing board, manually selecting with said stylus sheet position marks printed at predetermined locations on said second sheet, and (iv) instructing said computer to receive the sensed coordinates of the points on the second sheet selected by said stylus, to retrieve said transformed coordinates stored in memory, to inverse-transform said retrieved coordinates in response to the received coordinates of the points on the second sheet to obtain the coordinates of the ink measuring strips on the second sheet with respect to the digitizing board, and to command said X-Y positioning mechanism to move said optical densitometer in response to the inverse transformed coordinates so that the ink measuring strips are scanned regardless of the positions and orientations of the first and second sheets when the sheets are placed on the digitizing board and so that said second sheet need not be moved with respect to said digitizing board from the time that said sheet position marks on said second sheet are selected to the time that the ink measuring strips on the second sheet are scanned.

9. The method as claimed in claim 8 wherein the computer is instructed to perform steps (ii) and (iv) by selecting with said stylus predefined functions indicated on a menue board at a predefined region on said digitizing board.

10. The method as claimed in claim 8 wherein said ink measuring strips are selected with said stylus by selecting respective beginning and ending points for each ink measuring strip.

11. The method as claimed in claim 8 wherein said position marks define at least three non-collinear points and said inverse coordinate transformation in step (iv) compensates for the stretch of the printed sheet in two directions.

* * * * *